United States Patent [19]

McKenna et al.

[11] Patent Number: 5,018,775
[45] Date of Patent: May 28, 1991

[54] ROPE ASSEMBLY

[76] Inventors: Henry A. McKenna, 35 Hubbard Rd., Weston, Mass. 02193; David A. Richards, 11922 Cedar Form, Stafford, Tex. 77477

[21] Appl. No.: 448,558

[22] Filed: Dec. 11, 1989

[51] Int. Cl.⁵ .................................. B66C 1/12
[52] U.S. Cl. .................................. 294/74; 294/82.11
[58] Field of Search ............... 294/74, 82.35, 82.11, 294/82.12, 82.1; 87/8; 59/93

[56] References Cited

U.S. PATENT DOCUMENTS

| | | | |
|---|---|---|---|
| 1,646,546 | 10/1927 | Larsen | 294/82.35 X |
| 1,793,419 | 2/1931 | Seger | 294/74 X |
| 2,397,660 | 4/1946 | Hansen | 294/74 |
| 2,449,454 | 9/1948 | Cooke | 294/74 X |
| 3,722,942 | 3/1973 | Baur | 294/74 |
| 4,354,704 | 10/1982 | Mayerjak | 294/74 |
| 4,411,132 | 10/1983 | Crook, Jr. | 59/93 X |
| 4,593,599 | 6/1986 | Yeardly | 294/74 X |

Primary Examiner—Margaret A. Focarino
Assistant Examiner—Dean J. Kramer
Attorney, Agent, or Firm—Bill B. Berryhill

[57] ABSTRACT

Multiple leg rope assemblies formed from a single rope. In one embodiment, the single rope is doubled into equal length legs lashed side-by-side forming a looped eye at one end of the assembly, the ends of the rope at the other end of the assembly being formed into a pair of adjacent eyes which together create a clevis for connecting the rope assembly to other rope assemblies or fixtures. In another embodiment, a single rope, the ends of which are spliced together end-for-end to form a continuous loop, is doubled into four equal length legs lashed side-by-side to provide, at each end of the assembly, a pair of adjacent looped eyes which together create a clevis for connecting the rope assembly to other rope assemblies or fixtures. Several rope fittings or fixtures for use with the rope assemblies are disclosed.

20 Claims, 4 Drawing Sheets

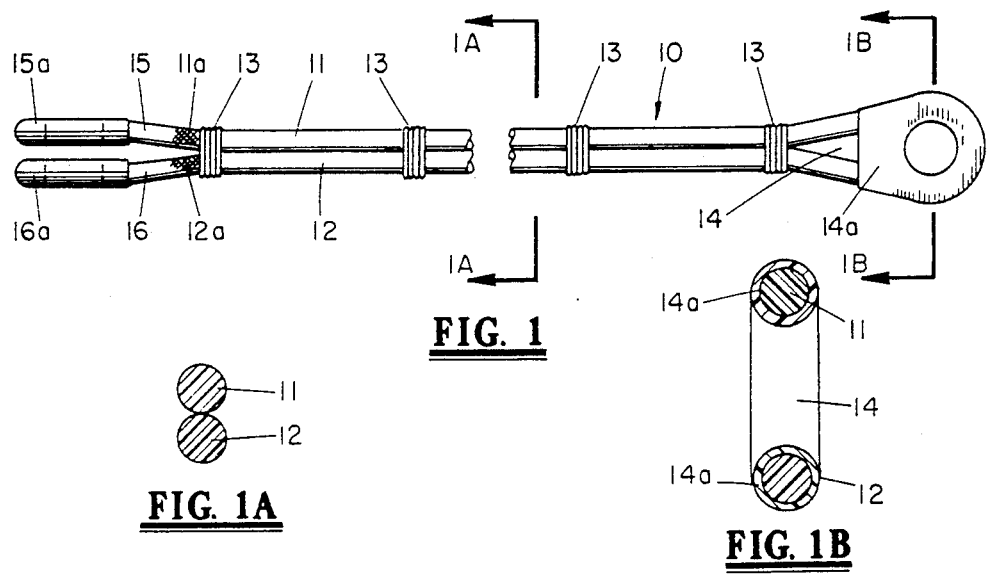
FIG. 1
FIG. 1A
FIG. 1B
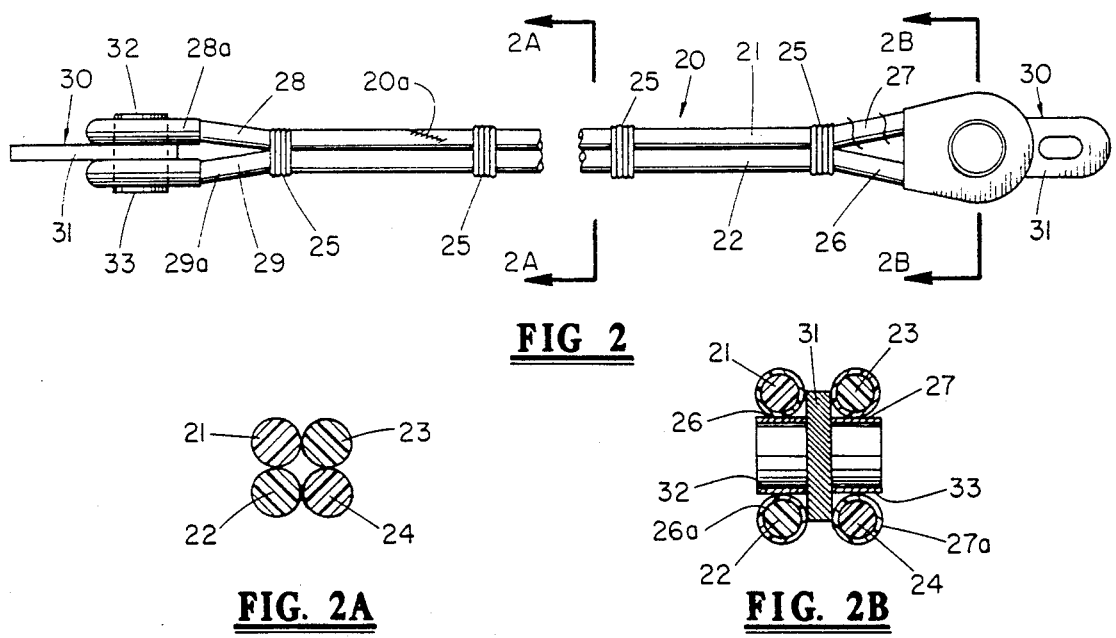
FIG 2
FIG. 2A
FIG. 2B

ROPE ASSEMBLY

BACKGROUND OF THE INVENTION

1. Field of the Invention

The present invention pertains to tension members such as wire or fiber rope which are used to transmit a force from one object to another or for carrying a load of some type. More specifically, the present invention pertains to multiple leg rope assemblies and fittings used therewith.

1. Description of the Prior Art

Typically, rope assemblies of the single leg type are utilized for a number of purposes in which a load or force is transmitted from one object to another. Such rope assemblies are used to lift loads by winches, cranes and the like, for towing land and water vehicles, for suspending bridge elements, etc. Marine operations utilize many rope assemblies in towing, anchoring, lifting, etc. In the past, these tension members were typically natural fiber ropes, wire ropes or chain. With improvements in synthetic fibers, recent years have seen development of high performance synthetic fiber ropes for tension members. In fact, synthetic fiber ropes are now made which have approximately the same strength as wire rope of the same diameter. Furthermore, synthetic fiber ropes are considerably lighter, corrosion resistant, more resilient and easier to handle. However, ropes or tension members of any kind usually require some sort of termination fitting for attachment to other rope assemblies, anchors, fittings, etc. Most of the termination fittings or other fittings for rope assemblies have been developed for wire rope or chain. These have been found unsuitable for many applications of fiber rope.

At the present time, there are a very small number of rope manufacturers that can produce synthetic fiber ropes of strength over six hundred thousand (600,000) pounds. In addition, such ropes may not be economically produced and are difficult to terminate. For this reason, it may be desirable to use multiple leg rope assemblies so that several smaller ropes in parallel may be utilized. The smaller size ropes are produced by many more manufacturers at a more reasonable cost. These multiple leg rope assemblies provide as much strength and weigh no more than the larger, more expensive and cumbersome single leg ropes.

At the present, there are available rope assemblies of synthetic fiber with great strength. However, because of their large size, the end fittings by which these rope assemblies are anchored or connected to other fittings or loads are very large, heavy and cumbersome. In addition, these end fittings cannot be easily disconnected while under tension and frequently are not removable without cutting the rope. Furthermore, these end fittings, when required to pass over or be wound onto curved surfaces, such as a winch or drum or roller, create a number of problems. Most importantly, when multiple layers of rope are wound onto a winch or drum so that the rope is wound over end fittings, the bulky underlaying end fittings require considerable volume and often cause damage to the rope. Furthermore, rigid terminations cause severe bending of the rope and terminations.

A typical termination for a rope assembly requires the fabrication of an eye or loop at the end of the rope. These eyes are often protected by metal thimbles which are placed inside the eye to act as a load bearing surface and to protect the rope. Such thimbles are large and heavy and act as an impediment to effective utilization of the rope. U.S. Pat. Nos. 2,426,538 and 2,495,951 illustrate sling and end fittings of one type in which a clevis is formed by splitting a single, large rope structure into two parts in order to form a clevis. Although the clevis is produced, the benefits of using a multiple leg assembly of smaller ropes is not obtained. Furthermore, this type of rigidly fixed clevis is not easily disconnected under tension and requires extremely close manufacturing tolerances complicated by the fact that the strands are on top of one another and some strands must travel a longer path over the fitting than others.

In many marine applications, it is desirable that rope assemblies have the ability to float or to be bouyant in water. Chains, wire rope and most higher performance fiber ropes do not float. When flotation is required, this is traditionally done by placing flotation sleeves on the rope. Flotation sleeves are relatively expensive, difficult to apply, vulnerable to damage and usually make the rope assembly difficult to handle and service. U.S. Pat. No. 4,593,599 discloses a single leg rope assembly made to float by wrapping buoyant material around the rope and covering it. A strong cover is necessary to hold the buoyant material in place.

Thus, it can be seen that the advent of high performance synthetic fiber rope has resulted in rope assemblies of improved characteristics. However, a number of problems are associated with such rope assemblies, particularly in the provision of termination fittings and other fittings for use therewith. Further improvements and developments in the utilization of fiber ropes are needed to obtain the greatest use thereof.

SUMMARY OF THE PRESENT INVENTION

In the present invention, multiple leg rope assemblies are formed from a single rope. In one embodiment, a single rope is doubled into two equal length legs lashed or otherwise restrained side-by-side forming a looped eye at one end of the assembly, the ends of the rope at the other end of the assembly being formed into a pair of adjacent eyes which together create a clevis for connecting the rope assembly to other rope assemblies or fixtures. In another embodiment, a single rope, the ends of which are spliced together end-for-end to form a continuous loop, is doubled into four equal length legs lashed side-by-side to provide, at each end of the assembly, a pair of adjacent looped eyes which together create a clevis for connecting the rope assembly to other rope assemblies or fixtures.

The open clevises formed at one end of the double leg assembly and at both ends of the quadruple leg assembly permit the utilization of unique end fittings. Several fitting embodiments are disclosed herein which have cylindrical pins or coaxially aligned cylindrical members which are mutually engageable with corresponding ones of adjacent eyes of the rope assembly clevis or clevises. The outer ends of the pins or cylindrical members may be provided with hemispherical caps so that if one of the caps is pulled onto a curved surface, such as on a winch, drum or roller, it will cause the fitting to roll to one side so the axes of the pins or cylindrical members are more nearly parallel to the axis of the curved surface. Not only does this aid in pulling the rope assembly across the curved surface, it allows the rope assembly to be wrapped on a drum, roller or the like in a much more compact manner, allowing it to flex at the axes of the pins resulting in less damage to fittings and to the rope of the rope assembly. In some embodiments of the invention, buoyant material is disposed adjacent to and in the space between rope legs, where it is more efficiently utilized and protected from damage, in order to render the rope assemblies more buoyant in water. In such cases, a compact rope assembly is obtained by enclosing the buoyant material and rope legs within a sheath of flexible protective material which may also perform the necessary functions of lashing the rope legs together.

Thus, the rope assembly and associated fittings of the present invention provide multiple leg ropes of great strength which utilize single ropes of small diameter having a combined strength as great as larger diameter single leg ropes. The smaller diameter rope is much easier to obtain and at less cost. Furthermore, end fittings can be utilized with the multiple leg ropes which are smaller, lighter and less cumbersome than end fittings of single leg ropes of the same strength. The unique arrangement of the multiple legs and end fittings results in balanced load sharing between the legs. The fittings disclosed and utilized with the rope assemblies of the present invention are particularly designed for pulling over or being wound onto curved surfaces such as drums and rollers, requiring less volume and creating less damage to rope assemblies than fittings of the prior art. The fittings of the present invention also permit the multiple leg assemblies thereof to be disconnected while under tension. Fittings of the present invention are also relatively, easily removable from the rope assemblies without having to cut or disassemble the ropes. In some embodiments of the invention, the multiple leg assemblies are provided with flotation material which is disposed between and enclosed with the legs of the assembly in a protective sheath. Many other objects, features and advantages of the invention will be apparent from reading the description which follows in conjunction with the accompanying drawings.

BRIEF DESCRIPTION OF THE DRAWINGS

FIG. 1 is an end-to-end view of a double leg rope assembly according to preferred embodiment of the invention;

FIG. 1A is a sectional view of the rope assembly of FIG. 1 taken along lines 1A—1A thereof;

FIG. 1B is a sectional view of the rope assembly of FIG. 1 taken along lines 1B—1B thereof;

FIG. 2 is an end-to-end view of a quadruple leg rope assembly, according to another preferred embodiment of the invention, and showing the rope assembly in combination with a rope fitting at each end thereof;

FIG. 2A is a sectional view of the rope assembly of FIG. 2 taken along lines 2A—2A thereof;

FIG. 2B is a sectional view of the rope assembly of FIG. 2 taken along lines 2B—2B thereof;

DESCRIPTION OF PREFERRED EMBODIMENTS

Figure 3:
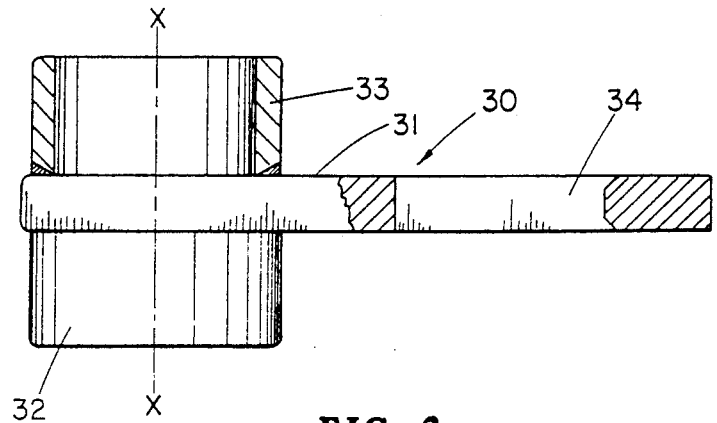
FIG. 3 is an edge view of a rope fitting of the type shown in combination with the rope assembly of FIG. 2.

Referring first to FIGS. 1, 1A and 1B, there is shown a rope assembly 10 made from a single rope which is doubled into two equal length legs 11, 12 which are lashed side-by-side with lashings 13. Although the rope 10 is preferrably of a synthetic fiber, it could be natural fibers, wire or any other suitable material. The doubled rope forms a looped eye 14 at one end of the assembly 10. The ends of the rope at the opposite end of the assembly 10 are doubled back and spliced onto itself at 11a and 12a to form a pair of adjacent eyes 15 and 16 which together create a clevis for connecting the rope assembly 10 to other rope assemblies or fixtures. The eyes 14, 15 and 16 at the ends of the rope assembly 10 may be encapsulated by a rugged polymeric plastic or other suitable material 14a, 15a, 16a. Some freedom of movement may be allowed in the lashings 13 and eyes 14, 15, and 16 so that the legs 11 and 12 may equalize the tension therein should they not be precisely the same length when assembled.

Referring now to FIGS. 2, 2A and 2B, there is shown a rope assembly 20 according to another preferred embodiment of the invention. In the rope assembly 20, the ends of a single rope are spliced together end-for-end at 20a to form a continuous loop which is then doubled into four equal length legs 21, 22, 23, 24 lashed side-by-side by lashings 25. At each end of the rope assembly 20, where the legs double back, there is formed a pair of adjacent looped eyes 26, 27 and 28,29, each pair of which creates a clevis for connecting the rope assembly 20 to other rope assemblies or fixtures. Like in the previous embodiment, the eyes 26, 27, 28 and 29 may be encapsulated in plastic 26a, 27a, 28a, 29a to protect the eye and the rope thereof. Thus, in the rope assembly 20 there are a pair of eyes 26, 27 at one end and a pair of eyes 28, 29 at the other.

Figure 4:
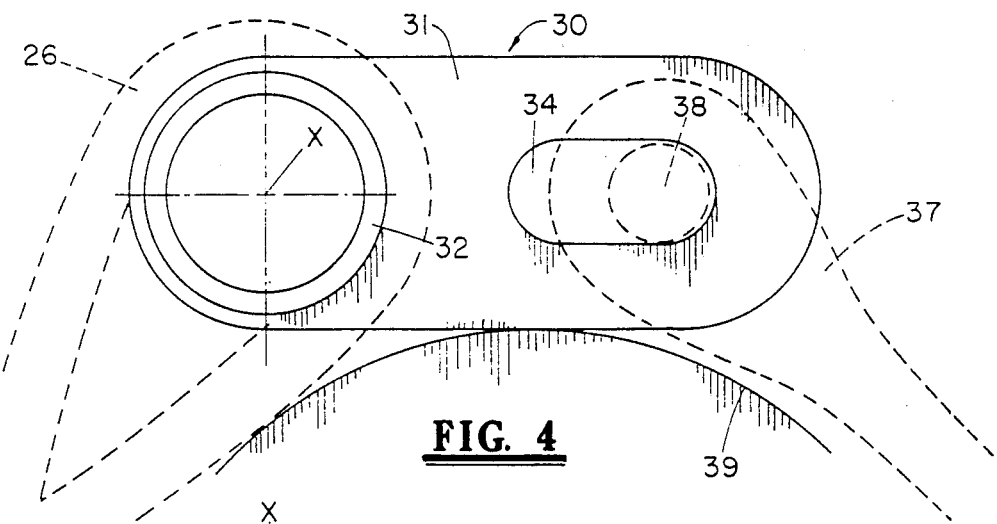
FIG. 4 is a side view of the fitting of FIG. 3.

It will also be noted in FIGS. 2 and 2B that a rope fitting 30 is connected at each end of the assembly 20. This fitting 30 is best shown in FIGS. 3 and 4 and may comprise an elongated plate member 31 from opposite sides of which project coaxially aligned cylindrical members 32 and 33. Actually, in the embodiment shown, the cylindrical members 32 and 33 are tubular. An aperture or opening 34 may be provided through the plate member 31 for receiving a pin or any other component so that the fitting 30 might be connected to another rope assembly, fitting or load carrying member. For example, a pin 38 is shown in FIG. 4 connecting a shackle 37 to fitting 30. As best seen in FIG. 2, the cylindrical projections 32 and 33 are mutually engagable with corresponding ones of adjacent eyes 26 (illustrated by dotted lines), 27 and 28, 29 of the clevis provided at each end of the rope assembly 20. This same fitting 30 could also be utilized with the clevis formed by the adjacent eyes 15 and 16 at one end of the rope assembly 10 of FIG. 1. The adjacent eyes 15 and 16 of assembly 10 and 26, 27, 28 and 29 of assembly 20 may be easily placed onto or removed from fitting 30 because of the flexibility of the rope. As illustrated in FIG. 4, this assembly is easily pulled over a curved surface 39.

Figure 5:
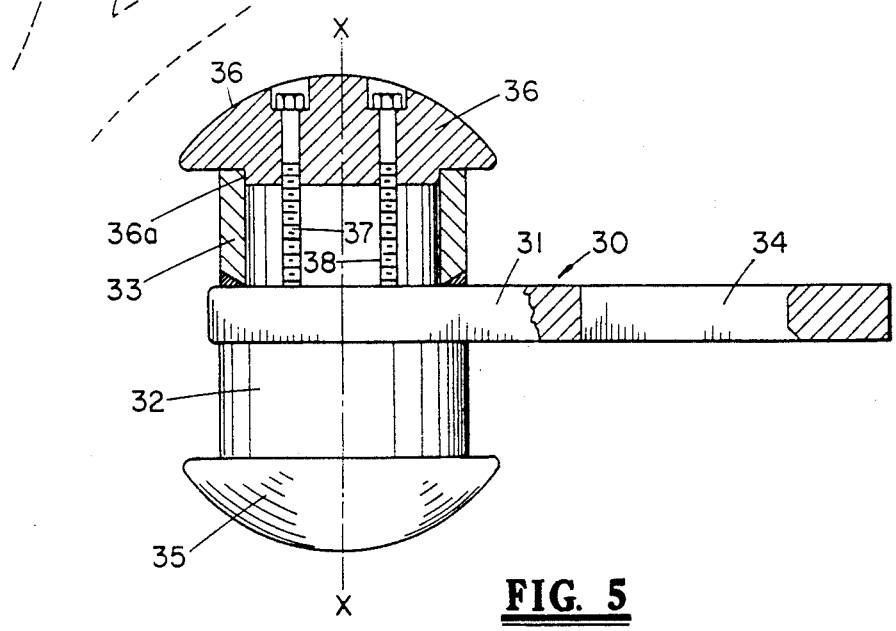
FIG. 5 is a edge view of the fitting of FIGS. 3 and 4, but showing a hemispherical cap attachment used therewith.

In FIG. 5, the rope fitting 30 of FIGS. 3 and 4 is shown with hemispherical caps 35 and 36 attached to the ends of the cylindrical or tubular projections 32 and 33. As best seen with reference to the cap 36, a portion of the cap may be cylindrically machined at 36a so that it may be inserted into the inside diameter of the tubular member 33. The caps 35 and 36 may be provided with recesses and holes to receive bolts 37 and 38 for connecting cap 35 to cap 36 holding them in place with their respective cylindrical projections or tubular members 32, 33.

If one of the cap members 35, 36 is pulled onto a curved surface, it will cause the fitting 30 to roll to one side so that the axis x—x of the cylindrical members 32, 33 will be more nearly parallel to the axis of the curved surface. This is extremely important when the fitting 30 and the rope assembly to which it is attached, whether rope assembly 10 of FIG. 1 or rope assembly 20 of FIG. 2, is pulled across a capstan, drum, roller or any other curved surface. It allows rope eyes 15 and 16 or rope eyes 26, 27, 28 and 29 to turn on pin 32 and 33 so that the assembly conforms to the curved surface, otherwise severe bending of the fitting 30 and rope attached thereto would occur. This is particularly true when the rope assemblies are wound onto a drum or winch. The rope fitting of FIGS. 3, 4 and 5 helps to equally distribute the loads thereon to the eyes of the particular rope assembly clevis with which it is associated as any imbalance creates a moment which is reacted by the plate 31 of fitting 30. The fitting 30 can be used to connect the rope assembly to another rope assembly, to another fitting or to an object which is being lifted, pulled or towed by the rope assembly to which it is attached.

Figure 6:
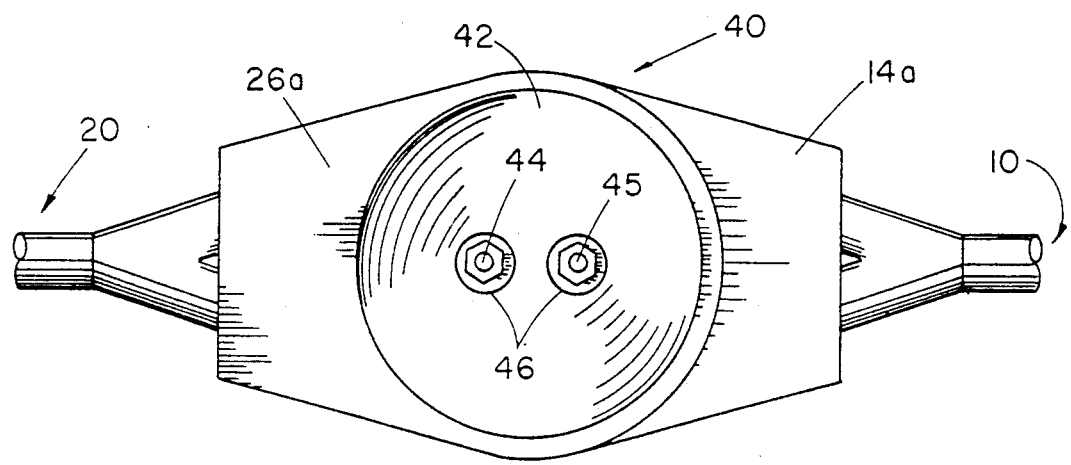
FIG. 6 is a side view of a rope fitting, according to another preferred embodiment of the invention.
Figure 7:
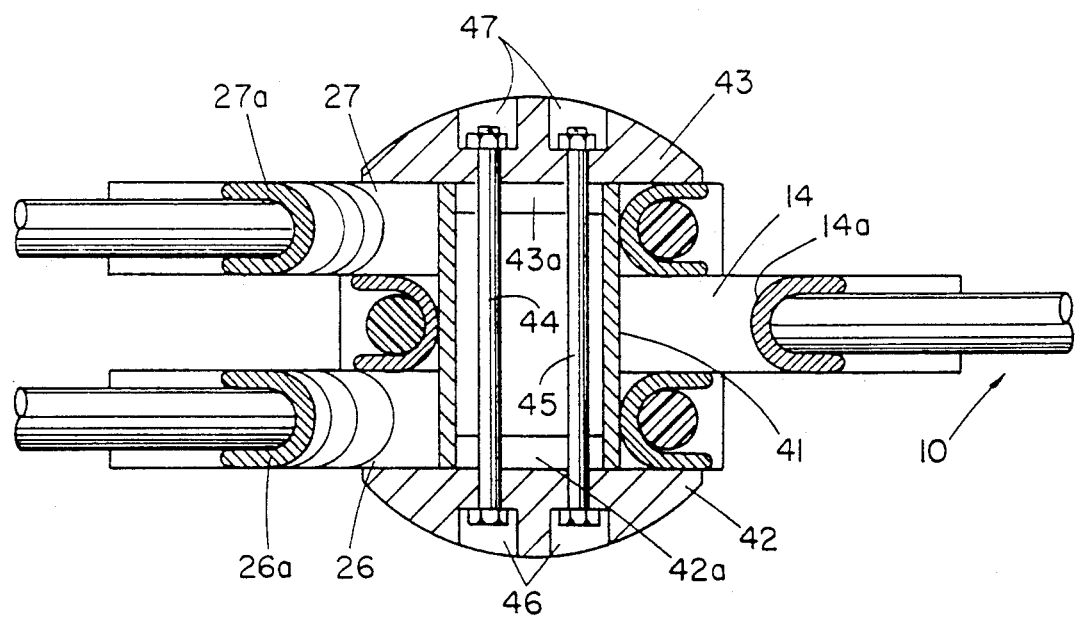
FIG. 7 is a cross-sectional view of the fitting of FIG. 6.

Referring now to FIGS. 6 and 7, there is shown another rope fitting or load carrying member 40 which is suitable for connecting a double eyed rope assembly to another rope assembly or load carrying member. For purposes of illustration, the fitting 40 will be described in FIGS. 6 and 7 for connection of the clevis of one rope assembly, such as rope assembly 20 of FIG. 2, to the single eye end of the rope assembly 10. Thus, the eyes 26 and 27 of the rope assembly 20 of FIG. 2 is shown connected to the eye 14 of the rope assembly 10 of FIG. 1. The eye 14 is disposed between adjacent eyes 26 and 27 of the clevis formed thereby.

The fitting 40 includes a cylindrical pin member 41 which is insertable through the clevis eyes 26 and 27 and the eye 14. The opposite ends of the pin 41 may be provided with hemispherical caps 42, 43. These caps 42, 43 may be removably attached to the pin 41 in any manner. In the embodiment shown, the pin 41 is hollow or tubular allowing interconnecting bolts 44, 45 to pass therethrough sandwiching the pin 41 between caps 42 and 43. Recesses 46, 47 are provided for the heads and nuts of the bolts 44, 45. The caps 42, 43 may be provided with cylindrical projections 42a, 43a, the diameter of which is slightly less that the internal diameter of the pin or tubular member 41. It is noted that the major diameter of the caps 42, 43 is greater than the diameter of the openings through the clevis eyes 26, 27 and the single eye 14, preventing accidental disengagement of these eyes from the pin member 41. In this embodiment, it may be desirable for the encapsulating materials 14a, 26a and 27a to be of metal rather than plastic. This would provide rigidity over some length which would provide a correcting moment to equalize tension should the legs of the rope assembly 20 not be exactly the same length.

The purpose of the hemispherical caps 42, 43 is the same as the purpose for the hemispherical caps 35, 36 of the embodiment of FIG. 5. If one of the caps 42, 43 is pulled onto a curved surface it will cause the pin member 41 to move to a position in which the axis thereof is more nearly parallel to the axis of the curved surface.

Figure 8:
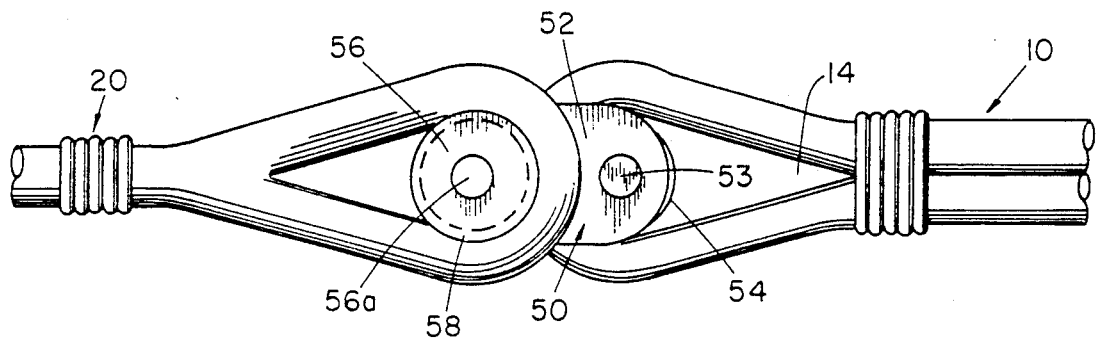
FIG. 8 is a side view of a pair of rope assemblies connected by a fitting, according to still another preferred embodiment of the invention.
Figure 9:
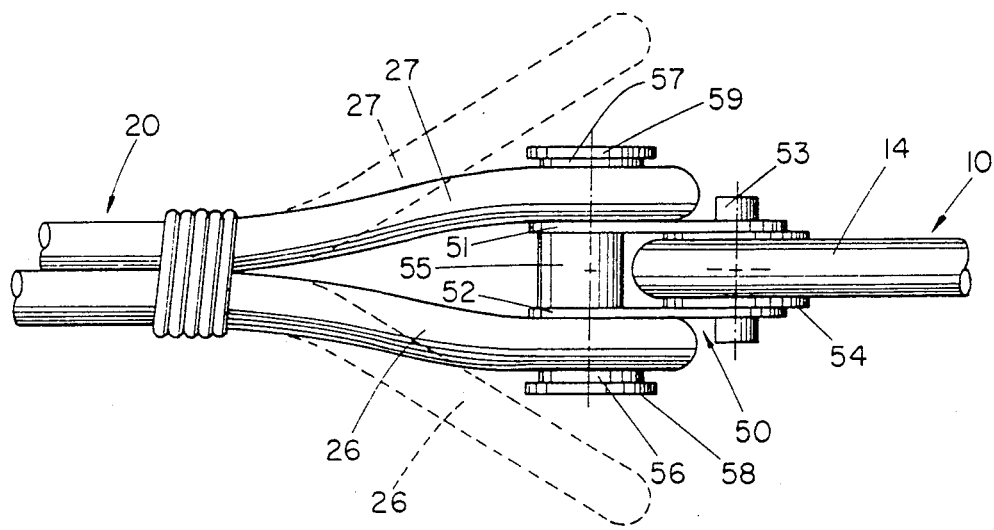
FIG. 9 is an edge view of the rope assemblies and fitting of FIG. 8.

Referring now to FIGS. 8 and 9, another fitting for use with the rope assemblies of the present invention will be described. This fitting, generally designated at 50 will be described, as in the previous fitting embodiment, connecting the double eyed clevis rope assembly 20 to the single eyed end of rope assembly 10 (See FIGS. 2 and 1, respectively). In this embodiment, the fitting 50 includes a pair of spaced apart elongated plate members 51, 52, corresponding ends of which are provided with coaxially aligned holes through which a pin member 53 may be inserted. Prior to insertion of the pin member 53, the single eye 14 of the rope assembly 10 may be disposed between the plate members 51 and 52 for mutual engagement by the pin 53. If desired, a spool 54 may be secured on the pin 53 to provide a larger curved bearing surface for the eye 14. A web or structural member 55 may be welded to plates 51, 52 so that they are maintained in a fixed, parallel, spaced relationship.

Projecting outwardly from the plates 51, and 52 are coaxially aligned cylindrical projections 56 and 57 the axes of which are parallel to, but spaced from, the axis of pin member 53. These cylindrical projections 56 and 57 are mutually engagable with corresponding ones of adjacent eyes 27 and 26 respectfully of a clevis of the rope assembly 20. The distance between the axes of the projections 56 and 57 and the axis of pin 53 provides an equalizing moment if the legs of the rope assembly 20 are not of the same length. For this reason, it is not necessary to have rigid metal thimbles in the eyes 14, 26, 27 of the rope assemblies 10 and 20. Retaining rings 58, 59 may be attached to the ends of the cylindrical projections 56, 57 to prevent accidental disengagement of the rope assembly eyes therefrom.

FIG. 9 also illustrates how the multiple leg rope assemblies 10 and 20 may be disconnected while one is under tension. For example, pin 53, by its projection beyond plates 51 and 52, can be held by a separate anchor device while rope assembly 20 is under tension. The tension in assembly 20 can be relieved and the rope assembly 20 removed from the fitting 50, after removal of retainers 58 and 59, by sliding the eyes 26 and 27 off of the projections 56 and 57 to the dotted line positions shown in FIG. 9. In the alternative, if tension is to be held on the rope assembly 20, a pin (not shown) may be inserted through holes 56a and 57a (not shown) in projections 56 and 57 to hold the rope assembly 20 in tension. The tension can be relieved in the rope assembly 10, the pin 53 removed and the spool 54 and the eye 14 of rope assembly 10 taken out of the fitting 50.

Figure 10:
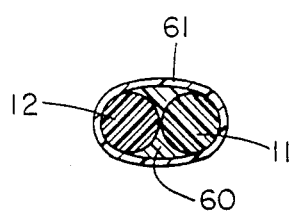
FIG. 10 is a cross-sectional view of a double leg rope assembly designed with flotation material therein, according to a preferred embodiment of the invention.

As earlier stated, multiple leg rope assemblies such as those shown in FIGS. 1 and 2 can be made more buoyant in water. This is done by placing buoyant material between adjacent legs and along the legs of the multiple rope assemblies. FIG. 10 is a cross-sectional view of double leg rope assembly, such as shown in FIG. 1, in which a buoyant material 60 is placed along side of the legs 11 and 12 in a normally void area. Then the legs 11, 12 and the buoyant material 60 are surrounded and enclosed within a protective sheath of flexible material 61. The buoyant material 60 can be of a number of materials. A good material may be closed-cell plastic foam. The sheath or covering 61 could be a braided wrap, lashing or extruded cover which would also perform the necessary function of holding rope legs together.

Figure 11:
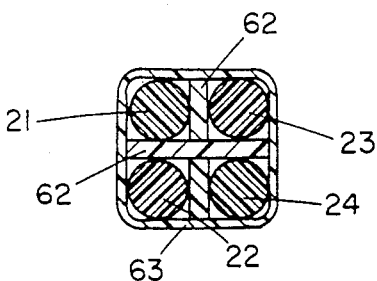
FIG. 11 is a cross-sectional view of a quadruple leg rope assembly provided with flotation material, according to another preferred embodiment of the invention.

FIG. 11 shows the cross-section of a multiple leg (quadruple leg) rope assembly, such as the one shown in FIG. 2, in which a buoyant material 62, e. g. closed-cell plastic foam, is placed between adjacent legs 21, 22, 23, 24 of the rope assembly. The legs 21, 22, 23, 24 and buoyant material 62 are then encased or sheathed within a cover 63. Note that the rope legs 21, 22, 23 and 24 retain and protect the buoyant material from external damage so that the sheath 63 may not be required to be continuous.

Figure 12:
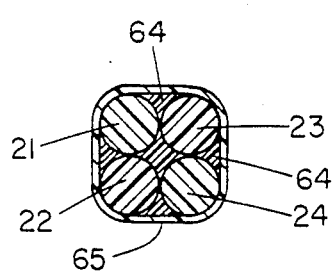
FIG. 12 is a cross-sectional view of a quadruple leg rope assembly provided with flotation material, according still another preferred embodiment of the invention.

FIG. 12 is a cross-section which shows another embodiment for a quadruple leg rope assembly in which the buoyant material 64 is placed in the recesses or crevices between legs 21, 22, 23, 24, much in the same fashion as in the double leg embodiment of FIG. 10. The rope legs 21, 22, 23, 24 and the buoyant material 64 are then sheathed or encased in a protective covering or sheath 65.

Thus, the present invention provides multiple leg rope assemblies, such as those shown in FIGS. 1 and 2, which have the same strength as single leg rope assemblies of much larger diameter rope. In addition to being more readily available and at a lower cost than larger diameter rope members, these unique rope assemblies allow the use of rope assembly terminations and fittings which are also unique. They are less cumbersome, more versatile, easier to attach and remove with or without tension and better adapted to pulling onto a drum, winch or other curved surfaces than single leg rope assemblies with terminations of current art and practice. These assemblies and fittings can be utilized in many combinations. For example, double leg assemblies, such as shown in FIG. 1 can be attached end-for-end or attached by interconnecting fittings or connectors of some type. Quadruple leg assemblies may be attached to one another end for end or by interconnecting fittings. A number of fittings can be utilized with either of these multiple leg assemblies for a number of purposes.

Several embodiments of the invention have been disclosed herein. Many variations thereof will be apparent to those skilled in the art. Accordingly, it is intended that the scope of the invention be limited only by the claims which follow.

We claim:

1. A rope assembly comprising a single rope which is doubled into two equal length legs restrained side-by-side and forming a looped eye at one end of said assembly, the ends of said rope at the other end of said assembly being formed into a pair of adjacent eyes which together create a clevis for connecting said rope assembly to other rope assemblies or fixtures, and a rope fitting comprising an elongated plate member from opposite sides of which project coaxially aligned cylindrical members each one of which is mutually engageable with corresponding ones of said adjacent eyes of said clevis, said plate member being provided with means spaced from said cylindrical members for attaching said rope fitting to a load carrying member, the outer ends of said cylindrical members being provided with separate and removably attached hemispherical caps so that if one of said caps is pulled onto a curved surface it will cause said fitting to roll to one side so the axis of said cylindrical members will be more nearly parallel to said curved surface.

2. A rope assembly comprising a single rope which is doubled into two equal length legs restrained side-by-side and forming a looped eye at one end of said assembly, the ends of said rope at the other end of said assembly being formed into a pair of adjacent eyes which together create a clevis, a related load carrying member one and of which is provided with an aperture or looped eye for coaxial disposition between said adjacent eyes of said clevis, a cylindrical pin member being insertable through said clevis eyes and said aperture or looped eye for mutual connection of said rope assembly and said related load carrying member, the opposite ends of said pin member being provided with hemispherical caps so that if one of said caps is pulled onto a curved surface it will cause said pin member to move to a position in which the axis thereof is more nearly parallel to said curved surface, at least one of said caps being removably attached to said pin member.

3. The combination of claim 2 in which the major diameter of said hemispherical caps is greater than the diameter of the opening through said clevis eyes to prevent accidental disengagement thereof.

4. A rope assembly comprising a single rope which is doubled into two equal length legs restrained side-by-side and forming a looped eye at one end of said assembly, the ends of said rope at the other end of said assembly being formed into a pair of adjacent eyes which together create a clevis, a related load carrying member, one end of which is provided with an aperture, and a rope fitting, said fitting comprising a pair of spaced apart elongated plate members the corresponding ends of which are provided with holes and between which said apertured end of said load carrying member may be disposed for mutual engagement by a connecting pin member, the opposite ends of each of said plate members being provided with coaxially aligned cylindrical projections the axes of which are parallel to but spaced from the axis of said holes and said pin member, each of said cylindrical projections being mutually engageable with corresponding ones of said adjacent eyes of said clevis.

5. The combination of claim 4 in which said related load carrying member is a rope or cable which bears against a spool member carried on said pin member between said plate members.

6. The combination of claim 4 in which said plate members are attached by a structural member fixing said plate members in a fixed spaced apart relationship.

7. The combination of claim 4 including retainer means engageable with the ends of said cylindrical projections to prevent disengagement of said clevis eyes therefrom.

8. The combination of claim 4 in which either said pin member or said cylindrical projections of said rope fitting are engageable to hold one of said rope assembly or related load carrying member in tension, relieving tension on the other of said rope assembly or related load carrying member to allow disengagement thereof from said rope fitting.

9. A rope assembly comprising a single rope which is doubled into two equal length legs restrained side-by-side and forming a looped eye at one end of said assembly, the ends of said rope at the other end of said assembly being formed into a pair of adjacent eyes which together create a clevis for connecting said rope assembly to another similar rope assembly having a looped eye at one end and a pair of adjacent eyes at the other, said looped eye of said another rope assembly being disposed between said pair of adjacent eyes of said first mentioned rope assembly and connected thereto by a pin member which slidingly and mutually engages corresponding eyes of said first mentioned and said another rope assembly.

10. The combination of claim 9 in which the ends of said pin member are provided with hemispherical caps so that if one of said caps is pulled onto a curved surface it will cause said pin member to move to a position in which the axis thereof is more nearly parallel to said curved surface.

11. A rope assembly comprising a single rope the ends of which are spliced together end-for-end to form a continuous loop which is doubled into four equal length legs restrained side-by-side providing, at each end of said assemblies, a pair of adjacent looped eyes which together create a clevis for connecting said rope assembly to other rope assemblies or fixtures, and a rope fitting comprising an elongated plate member from opposite sides of which project coaxially aligned cylindrical members each one of which is mutually engageable with corresponding ones of said adjacent eyes of one of said clevises, said plate member being provided with means spaced from said cylindrical members for attaching said rope fitting to a load carrying member, the outer ends of said cylindrical members being provided with separate and removably attached hemispherical caps to that if one of said caps is pulled onto a curved surface it will cause said fitting to roll to one side so the axis of said cylindrical members will be more nearly parallel to said curved surface.

12. A rope assembly comprising a single rope the ends of which are spliced together end-for-end to form a continuous loop which is doubled into four equal length legs restrained side-by-side providing, at each end of said assemblies, a pair of adjacent looped eyes which together create a clevis, a related load carrying member one end of which is provided with an aperture or looped eye for coaxial disposition between said adjacent eyes of one of said clevises, a cylindrical pin member being insertable through said eyes of one of said clevises and said aperture or looped eye for mutual connection of said rope assembly and said related load carrying member, the opposite ends of said pin member being provided with hemispherical caps so that if one of said caps is pulled onto a curved surface it will cause said pin member to move to a position in which the axis thereof is more nearly parallel to said curved surface, at least one of said caps being removably attached to said pin member.

13. The combination of claim 12 in which the major diameter of said hemispherical caps is greater than the diameter of the opening through said clevis eyes to prevent accidental disengagement thereof.

14. A rope assembly comprising a single rope the ends of which are spliced together end-for-end to form a continuous loop which is doubled into four equal length legs restrained side-by-side providing, at each end of said assemblies, a pair of adjacent looped eyes which together create a clevis, a related load carrying member, one end of which is provided with an aperture or looped eye, and a rope fitting, said fitting comprising a pair of spaced apart elongated plate members the corresponding ends of which are provided with holes and between which said apertured or looped eye end of said load carrying member may be disposed for mutual engagement by a connecting pin member, the opposite ends of each of said plate members being provided with coaxially aligned cylindrical projections the axes of which are parallel to but spaced from the axis of said holes and said pin member, each of said cylindrical projections being mutually engageable with corresponding ones of said adjacent eyes of one of said clevises.

15. The combination of claim 14 in which said related load carrying member is a rope or cable which bears against a spool member carried on said pin member between said plate members.

16. The combination of claim 14 in which said plate members are attached by a structural member fixing said plate members in a fixed spaced apart relationship.

17. The combination of claim 14 including retainer means engageable with the ends of said cylindrical projections to prevent disengagement of said clevis eyes therefrom.

18. The combination of claim 14 in which either said pin member or said cylindrical projections of said rope fitting are engageable to hold one of said rope assembly or related load carrying member in tension, relieving tension on the other of said rope assembly or related load carrying member to allow disengagement thereof from said rope fitting.

19. A rope assembly comprising a single rope the ends of which are spliced together end-for-end to form a continuous loop which is doubled into four equal length legs restrained side-by-side providing, at each end of said assemblies, a pair of adjacent looped eyes which together create a clevis, another rope assembly having a single looped eye at one end thereof, said looped eye of said another rope assembly being disposed between one of said pair of adjacent eyes of said first mentioned rope assembly and connected thereto by a pin member which slidingly and mutually engages corresponding eyes of said first mentioned and said another rope assembly.

20. The combination of claim 19 in which the ends of said pin member are provided with hemispherical caps so that if one of said caps is pulled onto a curved surface it will cause said pin member to move to a position in which the axis thereof is more nearly parallel to said curved surface.

* * * * *